Aug. 8, 1950

B. W. QUINBY ET AL 2,518,179

REMOVABLE METAL HONDA

Filed Nov. 4, 1948

INVENTOR.
Byron White Quinby &
Jesse Howard Quinby
BY Martin E. Anderson
ATTORNEY Patented Aug. 8, 1950

2,518,179

UNITED STATES PATENT OFFICE 2,518,179

REMOVABLE METAL HONDA

Byron White Quinby, Larned, and Jesse Howard Quinby, Sun City, Kans.

Application November 4, 1948, Serial No. 58,332

1 Claim. (Cl. 24—131)

This invention relates to improvements in practice lassos and has reference more particularly to a removable metal honda.

On ranches where cattle, horses and/or sheep are raised in large numbers, it is necessary to employ a lasso or lariat for catching and holding an animal.

In order to become proficient in the use of a lasso, a large amount of practice is necessary as the use of this simple device requires much skill and this is particularly true when the lassoing or "roping" of moving animals is concerned.

When an ordinary lasso is used for roping live animals, considerable difficulty is experienced in loosening the same, especially since the roper is usually mounted on a horse and the animals are somewhat wild. Loosening of the lasso requires the roper to dismount and remove the lasso or by suitable maneuvering to loosen the loop until it can pass over the animal which, in itself, is a difficult feat.

It is the object of this invention to produce a metal honda that can be readily attached to the loop at the end of the lasso rope and form an auxiliary loop into and out of which the rope may be moved through a resiliently closed gap that permits the rope to be disconnected therefrom by exerting on it a sufficiently strong force.

Another object is to produce a metal honda of such a design that it can be readily formed from heavy resilient wire and which can therefore be constructed and sold at a moderate price.

A further object is to produce a metal honda of such shape that after it has been attached to the rope it will normally project in the direction of the length of the rope.

The above and any objects that may appear as the description proceeds are attained by means of a construction that will now be described in detail, and reference for this purpose will be had to the accompanying drawing in which the invention has been shown and in which.

Figure 1:
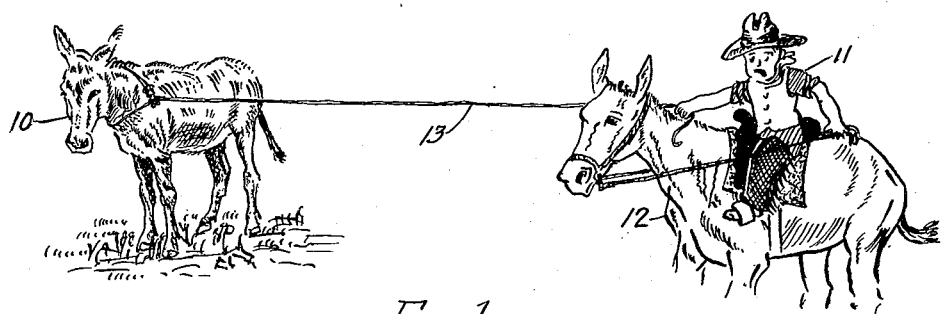
Figure 1 is an illustration showing one specific use of the invention.
Figure 2:
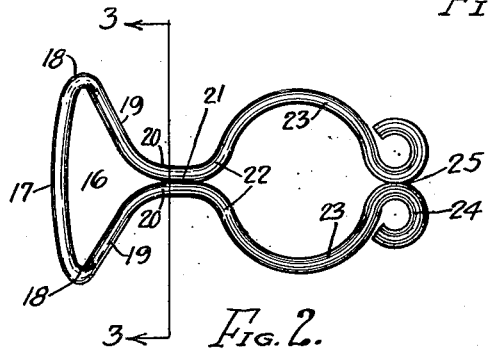
Figure 2 is a plan view of the invention looking downwardly in the direction of arrow 2, in Figure 4.
Figure 3:
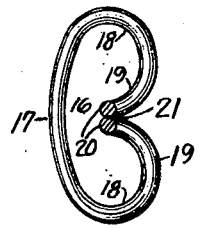
Figure 3 is a section taken on line 3—3, Figure 2.

In the drawing, reference numeral 10 designates an animal to be roped and reference numeral 11 represents the roper who is positioned on a horse 12 and holds in one hand a lasso rope 13.

Figure 5:
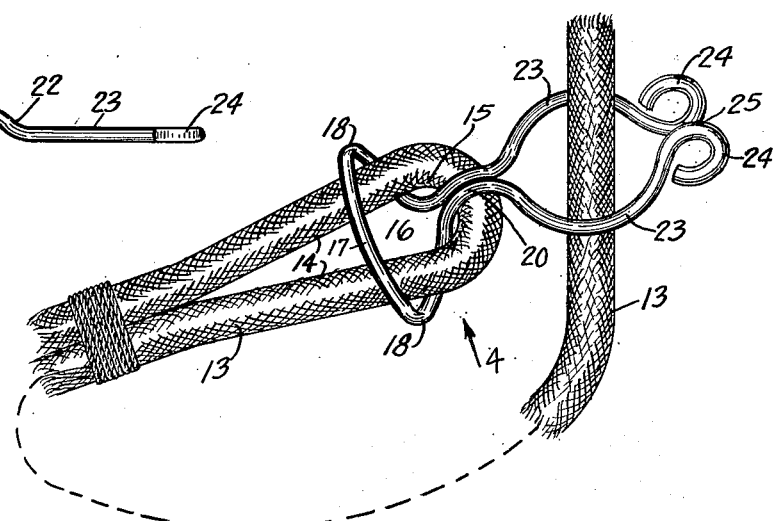
Figure 5 is a view in perspective showing the relationship of the honda to the lasso rope.

Referring now to Figure 5, it will be observed that rope 13 is provided at one end with a loop, usually referred to by the name "honda," whose sides have been designated by numeral 14, the bight having been designated by 15.

Applicants have combined with the usual lasso a readily removable metallic honda which cooperates with the lasso and adapts it for practice use.

The auxiliary metallic honda is formed from a large size or heavy wire of resilient metal which has been reversely bent and formed at its middle point with an elongated loop 16. Side 17 of loop 16 is joined by ends 18 to the inwardly ranging parts 19 that in turn merge with the laterally extending fingers 20 that come into contact at 21, or at least into close adjacency. Fingers 20 are upwardly convex at 20 for a purpose that will presently appear. At 22, fingers 20 begin to curve outwardly forming substantially semicircular parts 23 whose ends terminate in circular portions 24 that are in contact or in close adjacency at 25. The material used must be resilient to the extent that ends 24 may be separated sufficiently to permit rope 13 to pass between the ends in either direction without producing a permanent set.

Figure 4:
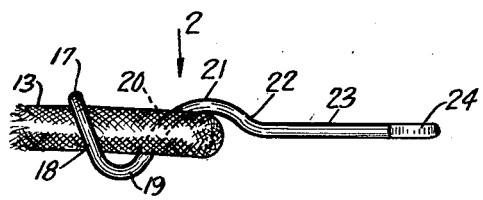
Figure 4 is a side elevation looking in the direction of arrow 4, Figure 5, that portion of the rope passing through the opening being omitted.

Referring now more particularly to Figures 4 and 5, it will be observed that the plane of loop 16 makes an angle of nearly 90 degrees with the plane of curved portions 23 and that the parts are so bent that the rope is substantially straight as shown in Figure 4. This is of importance because it is desirable that arms 23 shall project parallel with the loop at the end of the rope.

Referring now to Figure 5 which shows the lasso arranged for practice, it will be obvious that the rope may be removed from the opening and inserted by passing between ends 24.

Let us now assume that the roper has roped or lassoed an animal as shown in Figure 1 and that he wants to release the lasso from the animal. The roper merely exerts a strong pull on the rope or gives it a jerk whereby the rope will pull out between ends 24; he may now reestablish his running noose by merely passing the rope into the opening between ends 24. It is, therefore, evident that the lasso may be used for practice without the necessity of dismounting to release it from the animal.

Attention is called to the fact that this improved honda can be quickly applied to any lasso thus adapting it for practice use.

When the lasso is to be used for catching and holding animals, the auxiliary honda is removed and the rope threaded through the loop at the end of the rope. Owing to the fact that the same lasso rope can be used for actual use and for practice use, it obviates the necessity of having a special lasso for practice.

Having described the invention, what is claimed as new is:

In a practice honda of the type having a pair of resilient fingers juxtaposed at their forward free ends and spread apart rearwardly thereof and thence together to provide an opening rearwardly of their free ends for receiving the running portion of a lasso rope having a closed loop at one end thereof formed by parallel portions of the rope connected by a bight portion, the fingers being normally in engagement and adapted to spread apart to permit the running portion of the rope to pass outwardly between the free ends of the fingers, the improvement which comprises; a pair of juxtaposed members extending rearwardly from the fingers at the rear end of the opening and curved laterally of the plane of said free ends to engage the bight of the loop at one side of the rope and to extend part way around the bight, and thence diverging in a rearward direction and extending at an angle to and intersecting said plane and curved to pass around the parallel portions of the loop at the opposite side of the rope, and thence around outer sides of the parallel portions and back to the first named side of the rope, and being joined together by a bight portion at the rearmost end of the honda adapted to extend between and abut the parallel portions at said first named side of the rope, the honda being attachable to the rope by passing the loop between the last named bight portion and the portions joining same to the fingers, moving the honda rearwardly along the loop until the free ends of the fingers will pass through the loop, passing the fingers through the loop, and moving the honda forwardly to a position wherein the honda is disposed in a position of securement to the rope wherein the honda is adapted to form a continuation of the loop and is adapted to be restrained from any substantial movement in the plane of the parallel portions of the rope and in a direction perpendicular thereto.

BYRON WHITE QUINBY.
JESSE HOWARD QUINBY.

REFERENCES CITED

The following references are of record in the file of this patent:

UNITED STATES PATENTS

| Number | Name | Date |
| --- | --- | --- |
| 660,078 | Moore | Oct. 16, 1900 |
| 748,283 | Jenkins | Dec. 29, 1903 |
| 1,240,377 | Seng | Sept. 18, 1917 |
| 1,397,126 | Keenum | Nov. 15, 1921 |